(12) United States Patent
Zions

(10) Patent No.: US 11,126,465 B2
(45) Date of Patent: Sep. 21, 2021

(54) ANTICIPATORY COLLECTION OF METRICS AND LOGS

(71) Applicant: Microsoft Technology Licensing, LLC, Redmond, WA (US)

(72) Inventor: Jason Zions, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1067 days.

(21) Appl. No.: 15/467,355

(22) Filed: Mar. 23, 2017

(65) Prior Publication Data

US 2018/0276043 A1 Sep. 27, 2018

(51) Int. Cl.
| G06F 9/50 | (2006.01) |
| G06F 11/30 | (2006.01) |
| G06F 11/07 | (2006.01) |
| G06F 11/34 | (2006.01) |

(52) U.S. Cl.
CPC .......... *G06F 9/5027* (2013.01); *G06F 11/079* (2013.01); *G06F 11/0709* (2013.01); *G06F 11/0793* (2013.01); *G06F 11/3051* (2013.01); *G06F 11/3409* (2013.01); *G06F 11/3476* (2013.01)

(58) Field of Classification Search
CPC .............. G06F 11/0709; G06F 11/079; G06F 11/0793; G06F 11/3051; G06F 11/3409; G06F 11/3476; G06F 9/5027
See application file for complete search history.

(56) References Cited

U.S. PATENT DOCUMENTS

| 8,141,051 B2* | 3/2012 | Huang ................ G06F 11/3409 717/127 |
| 10,365,986 B2* | 7/2019 | Aguiling ............. G06F 11/3428 |
| 10,474,551 B2* | 11/2019 | Das ........................ G06F 11/004 |
| 10,505,805 B1* | 12/2019 | Viswanathan ...... H04L 41/0863 |
| 2002/0191952 A1* | 12/2002 | Fiore ...................... H04N 5/781 386/217 |
| 2004/0078723 A1* | 4/2004 | Gross .................... G06F 21/577 714/47.2 |

(Continued)

OTHER PUBLICATIONS

Use PowerShell to enable Azure Diagnostics in a virtual machine; by Saurabh Bhatia et al.; Published on Dec. 15, 2015.

(Continued)

*Primary Examiner* — Manuel A Rivera Vargas
*Assistant Examiner* — Yaritza H Perez Bermudez
(74) *Attorney, Agent, or Firm* — Ray Quinney & Nebeker; Tiffany Healy

(57) ABSTRACT

A system includes a processor and machine readable instructions stored on a tangible machine readable medium, which when executed by the processor, configure the processor to collect data regarding resource use within a computing system, the data being collected periodically, without running a diagnostic program, and before occurrence of a diagnosis worthy event; and provide the collected data to the diagnostic program executed after the occurrence of the diagnosis worthy event so that the diagnostic program has data from before the occurrence of the diagnosis worthy event to enable determination of a cause of the diagnosis worthy event.

20 Claims, 4 Drawing Sheets

(56) References Cited

U.S. PATENT DOCUMENTS

| | | | |
|---|---|---|---|
| 2005/0138111 A1* | 6/2005 | Aton | G06F 11/3476 709/201 |
| 2005/0261878 A1 | 11/2005 | Shrivastava et al. | |
| 2005/0288903 A1* | 12/2005 | Jackson | G07C 3/00 702/187 |
| 2006/0293811 A1* | 12/2006 | Andreasen | G07C 5/0808 701/31.4 |
| 2009/0158091 A1* | 6/2009 | Day | G06F 11/0715 714/25 |
| 2010/0332909 A1 | 12/2010 | Larson | |
| 2011/0060948 A1* | 3/2011 | Beebe | H04L 43/16 714/37 |
| 2013/0080375 A1 | 3/2013 | Viswanathan et al. | |
| 2014/0059388 A1* | 2/2014 | Patiev | G06F 11/0748 714/37 |
| 2014/0379901 A1* | 12/2014 | Tseitlin | H04L 41/5096 709/224 |
| 2015/0324219 A1 | 11/2015 | Fitzgerald et al. | |
| 2016/0012200 A1* | 1/2016 | Malinowski | G06F 11/0778 705/2 |
| 2016/0094401 A1 | 3/2016 | Anwar et al. | |
| 2016/0259677 A1* | 9/2016 | Della Corte | G06F 11/079 |
| 2016/0350173 A1 | 12/2016 | Ahad | |
| 2017/0123890 A1* | 5/2017 | Haridas | G06F 16/10 |
| 2017/0220404 A1* | 8/2017 | Polar Seminario | G06F 11/1417 |
| 2017/0359234 A1* | 12/2017 | Gross | G06F 11/3476 |
| 2018/0060151 A1* | 3/2018 | Gross | G06F 21/552 |
| 2018/0173583 A1* | 6/2018 | Braundmeier | G06F 11/0781 |
| 2018/0259951 A1* | 9/2018 | Tamakoshi | G01M 13/00 |
| 2018/0314250 A1* | 11/2018 | Lewis | G06N 3/063 |
| 2019/0138415 A1* | 5/2019 | Chen | G06F 11/3034 |
| 2019/0168549 A1* | 6/2019 | Kanbayashi | B60R 16/023 |
| 2019/0310620 A1* | 10/2019 | Kamiguti | G05B 23/0283 |
| 2019/0319839 A1* | 10/2019 | Nozhchev | G06F 8/65 |
| 2019/0372832 A1* | 12/2019 | Liu | H04L 41/0859 |

OTHER PUBLICATIONS

"International Search Report and Written opinion Issued in PCT Application No. PCT/US18/22125", dated Jun. 18, 2018, 13 Pages.

"Office Action Issued in European Patent Application No. 18715326.7", dated Oct. 2, 2020, 5 Pages.

* cited by examiner

ANTICIPATORY COLLECTION OF METRICS AND LOGS

FIELD

The present disclosure relates generally to computer diagnostic systems and more particularly to collecting resource usage data before an event occurs and providing the data to a diagnostic program executed after the event occurs for analysis.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many operating systems provide tools for collecting data regarding the operation of a computer system and associated resources. In some instances, the data may be collected continuously. Collecting the data continuously consumes a lot of resources of the computer system such as processor time, amount of memory, disk input/output operations per second (IOPS), and so on. The resources consumed by collecting the data become unavailable to user applications running on the computer system. Accordingly, while the data can help diagnose errors that may occur from time to time, collecting the data continuously can also negatively impact performance of the user applications.

Alternatively, such data may be collected only when an error occurs. For example, an occurrence of an error may trigger execution of a diagnostic program that then begins collecting data for the purpose of analyzing the error. However, in this case, the data leading up to the occurrence of the error is unavailable, and determining a cause of the error may be difficult without such data.

SUMMARY

A system comprises a processor and machine readable instructions stored on a tangible machine readable medium, which when executed by the processor, configure the processor to collect data regarding resource use within a computing system, the data being collected periodically, without running a diagnostic program, and before occurrence of a diagnosis worthy event; and provide the collected data to the diagnostic program executed after the occurrence of the diagnosis worthy event so that the diagnostic program has data from before the occurrence of the diagnosis worthy event to enable determination of a cause of the diagnosis worthy event.

In other features, the machine readable instructions further configure the processor to provide the collected data to the diagnostic program with timestamps indicating times when the data was collected.

In other features, the collected data from before the occurrence of the diagnosis worthy event and data collected by the diagnostic program in real time after the occurrence of the diagnosis worthy event are processed by the diagnostic program to provide to an analyzer that analyzes the processed data to determine the cause of the diagnosis worthy event.

In other features, collecting the data periodically and without running the diagnostic program consumes fewer resources than collecting data by running the diagnostic program.

In other features, the collected data includes data regarding use of one or more of processing and storage resources by the computing system.

In other features, the machine readable instructions further configure the processor to store the collected data in a circular buffer having a predetermined amount of memory.

In other features, the machine readable instructions further configure the processor to collect and store the data using less than or equal to a predetermined amount of resources allocated to the computing system.

In other features, the machine readable instructions further configure the processor to store at least some of the collected data in a compressed form, and provide the collected data in a decompressed form to the diagnostic program.

In other features, the collected data is used by an analyzer to generate a recommendation for reconfiguring the computing system or for reconfiguring one or more resources of the computing system.

In still other features, a method comprises collecting data regarding resource use within a computing system; collecting the data periodically, without running a diagnostic program, and before occurrence of an event to be diagnosed; and providing the collected data to the diagnostic program executed after the occurrence of the event so that the diagnostic program has data from before the occurrence of the event to enable determination of a cause of the event.

In other features, the method further comprises providing the collected data to the diagnostic program with timestamps indicating times when the data was collected.

In other features, the collected data from before the occurrence of the event and data collected independently by the diagnostic program in real time after the occurrence of the event are processed by the diagnostic program to enable determination of the cause of the event.

In other features, collecting the data periodically and without running the diagnostic program consumes fewer resources than collecting data by running the diagnostic program.

In other features, the method further comprises collecting the data including data regarding use of one or more of processing and storage resources by the computing system.

In other features, the method further comprises storing the collected data in a circular buffer having a predetermined amount of memory.

In other features, the method further comprises collecting and storing the data using less than or equal to a predetermined amount of resources allocated to the computing system.

In other features, the method further comprises storing at least some of the collected data in a compressed form, and providing the collected data in a decompressed form to the diagnostic program.

In other features, the method further comprises providing a recommendation for reconfiguring the computing system or for reconfiguring one or more resources of the computing system based on the collected data.

In still other features, a system comprises a processor and machine readable instructions stored on a tangible machine readable medium, which when executed by the processor, configure the processor to collect data regarding use of one or more of processing and storage resources by a computing system, the data being collected periodically in a circular buffer, without running a diagnostic program, and before occurrence of an event to be diagnosed by the diagnostic program; and provide the collected data, with timestamps indicating times when the data was collected, to the diagnostic program when the diagnostic program is executed after the occurrence of the event so that the diagnostic program has the data, from before the occurrence of the event and data collected independently by the diagnostic program in real time after the occurrence of the event, to enable determination of a cause of the event.

In other features, the machine readable instructions further configure the processor to collect and store the data using less than or equal to a predetermined amount of resources allocated to the computing system. Collecting the data periodically and without running the diagnostic program consumes fewer resources than collecting data by running the diagnostic program.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

The present disclosure relates to a novel system and method for collecting data that can not only conserve resources by periodically collecting a limited amount of data before an event of diagnostic interest occurs, but can also help in diagnosing the event by providing the data to a diagnostic program executed after the event occurs. As explained below in detail, the data is collected without executing a diagnostic program. The kind of data that is collected is also different than that typically collected by the diagnostic program. Specifically, the amount of resources consumed in collecting and storing the data are far less than those typically consumed by the kind of data collected by the diagnostic program. Further, when an event to be diagnosed occurs and triggers (e.g., by user action) the execution of the diagnostic program, the data collected before the occurrence of the event is provided to the diagnostic program with timestamps indicating that the data was collected before the event occurred. Accordingly, the diagnostic program can process the data collected from before the event occurred as well as the data it collects in real time after the occurrence of the event to determine the cause of the event. These and other features of the novel system and method of the present disclosure are described below in detail.

Throughout the present disclosure, a virtual machine running on a cloud computing system is used an example for illustrative purposes only. The teachings of the present disclosure are not restricted to a virtual machine running on a cloud computing system; rather, the teachings of the present disclosure are equally applicable to a virtual machine running on a standalone computer system running on premises. Further, the teachings of the present disclosure are not restricted to a virtual machine at all; rather the teachings of the present disclosure are equally applicable to a physical host in the absence of virtualization (i.e., a non-virtualized on-premises node). Throughout the present disclosure, a virtual machine running on a cloud computing system, a virtual machine running on an on-premises standalone computer system, and a physical host without virtualization (i.e., a non-virtualized on-premises node) are collectively referred to as a computing device or a computing system.

Figure 4:
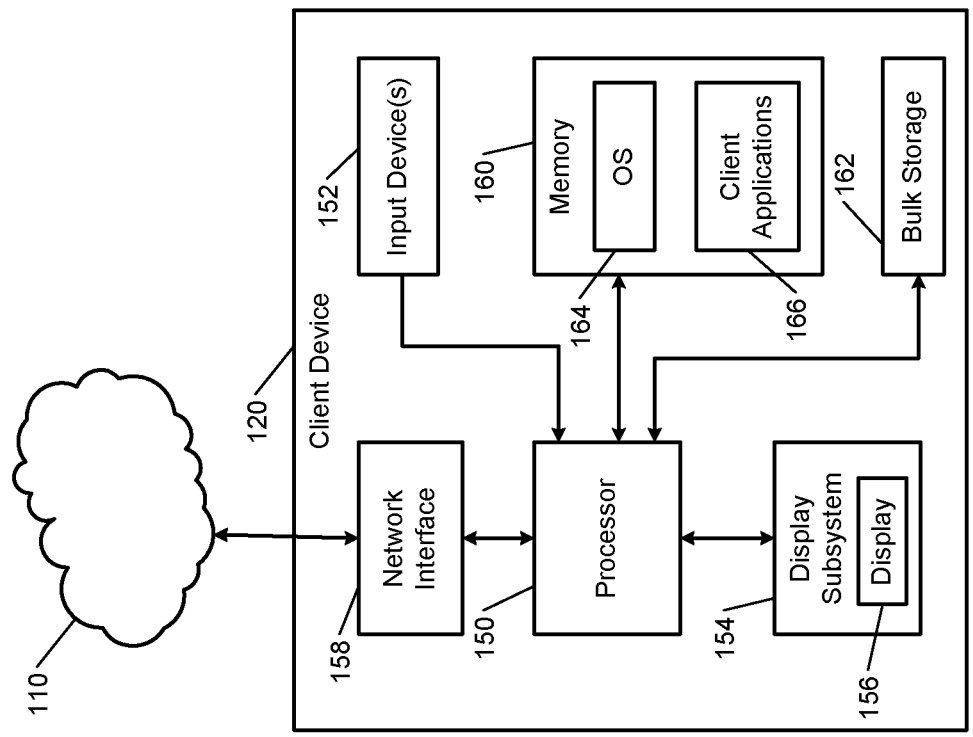
FIG. 4 is a functional block diagram of a simplified example of a client device used in the distributed network system of FIG. 3.
Figure 5:
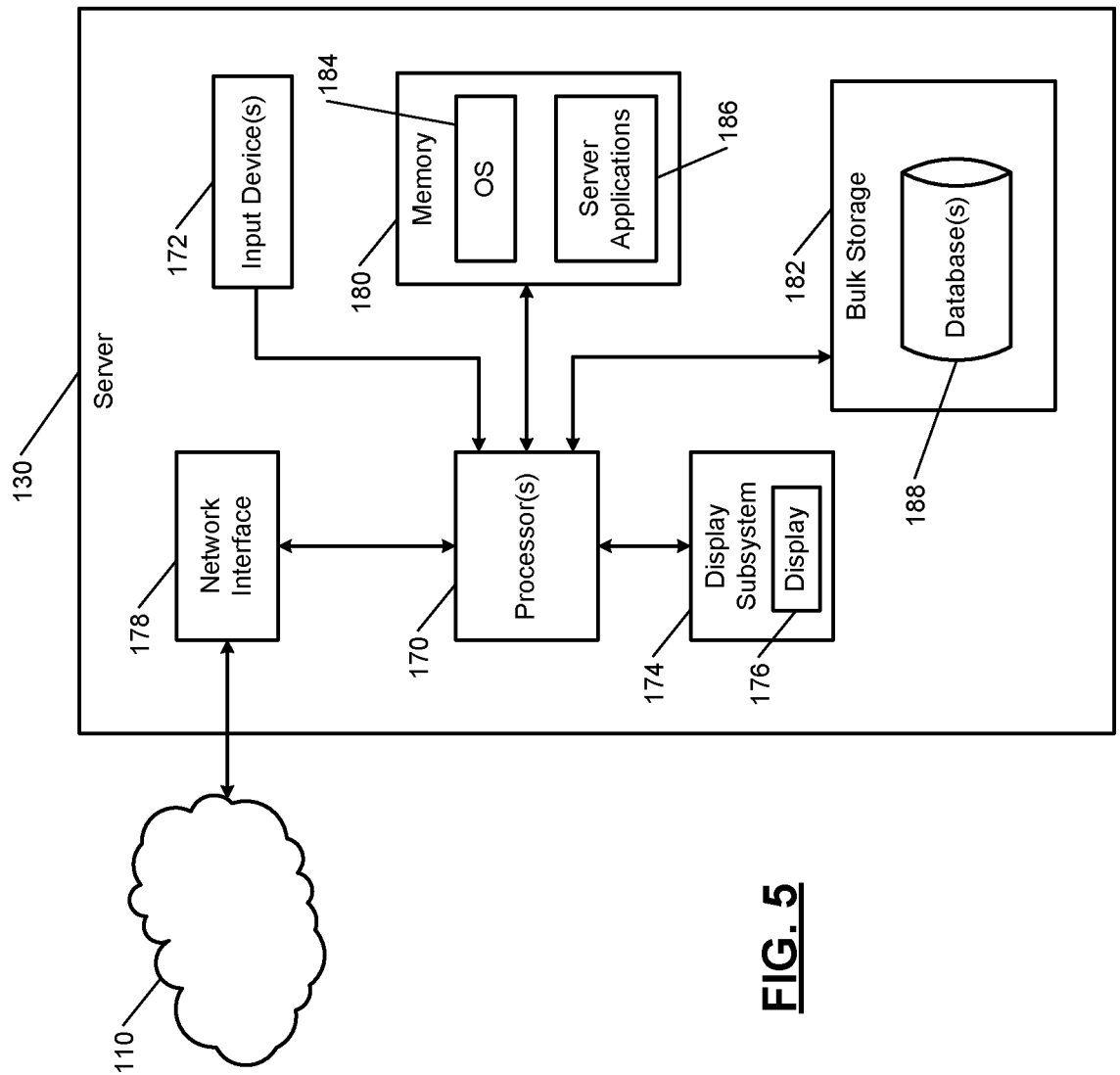
FIG. 5 is a functional block diagram of a simplified example of a server used in the distributed network system of FIG. 3.

The present disclosure is organized as follows. As an example of an environment in which the method of the present disclosure can be implemented, a general architecture of a cloud computing system is initially presented with reference to FIG. 1. For example only, any virtual machine running on the cloud computing system can implement the method of the present disclosure. Subsequently, a brief overview of the method is presented followed by a detailed description of the method and its technical effects. The method is then described with reference to a flowchart shown in FIG. 2. In FIGS. 3-5, a simplified example of a distributed network system is presented that can implement the cloud computing system. Any node of the distributed network system can run a virtual machine that can in turn implement the method of the present disclosure.

Figure 1:
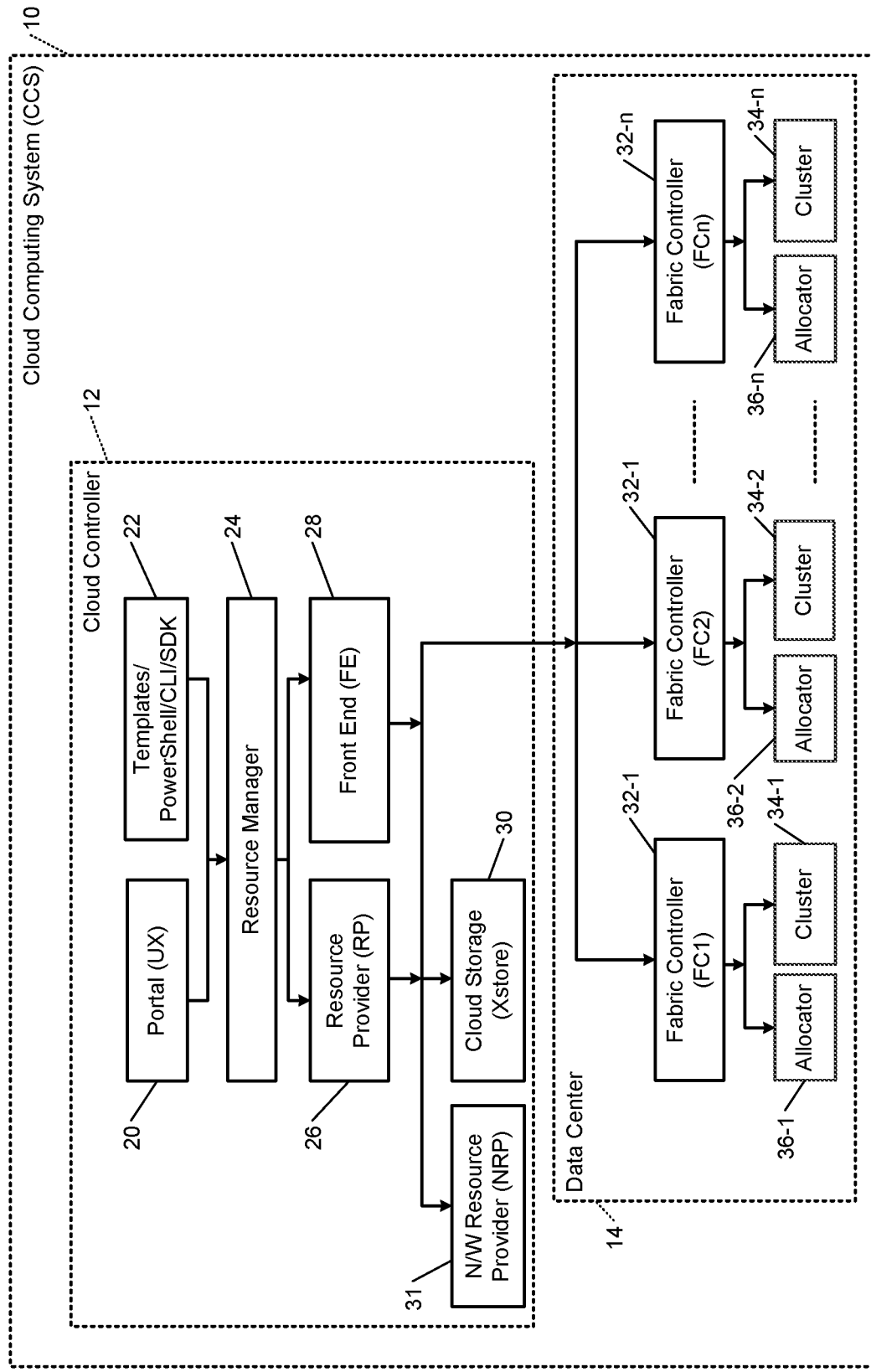
FIG. 1 is a functional block diagram of a simplified example of a cloud computing system that can be used to deploy virtual machines.

FIG. 1 shows a simplistic example of a cloud computing system (CCS) 10 according to the present disclosure. The cloud computing system 10 includes a cloud controller 12 and at least one data center 14. While only one data center 14 is shown for simplicity, the cloud controller 12 can interface with a plurality of data centers. Further, while the data center 14 is shown as being local to the cloud controller 12, one or more data centers may be geographically remote from the cloud controller 12, may be located in different geographic locations (e.g., in different time zones, different countries or continents, and so on), and may communicate with the cloud controller 12 via various networks. The cloud controller 12 controls one or more data centers 14.

Each data center 14 includes a plurality of fabric controllers 32-1, 32-2, ..., and 32-n (collectively fabric controllers 32) and corresponding clusters 34-1, 34-2, ..., and 34-n (collectively clusters 34). Each fabric controller 32 controls a respective cluster 34. Each cluster 34 includes a plurality of racks (not shown), and each rack includes a plurality of nodes (also not shown), which are also called servers, hosts, or machines throughout the present disclosure. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32 of one or more data centers 14. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32. One or more virtual machines (VMs) may be deployed in a cluster 34 based on the tenant model.

The compute resource provider 26 requests actions to be taken within a deployed VM through a guest agent, which is software or program running within the VM and which communicates via a secure channel with the compute resource provider 26 and acts on behalf of the compute resource provider 26. A diagnostic program is installed and enabled within a VM by the compute resource provider 26, acting through the guest agent. The compute resource provider 26 instructs the guest agent to install/enable the diagnostic program. The novel system and method of the present disclosure may be implemented within the guest agent, making it easy to perform the handshake between the diagnostic program and the code in the guest agent discussed below. In an alternative implementation, the compute resource provider 26 may use appropriate credentials (injected into the VM when the compute resource provider 26 provisioned the VM) to remotely access the VM, issuing commands which start the diagnostic program.

A brief overview of the inventive method is now presented. Generally, the present disclosure relates to anticipatory collection of metrics within a system, such as a VM. Metrics are measurements (e.g., number errors within a time interval). Typically, a deeper level of diagnostics is turned on within a VM or any other resource provider upon an issue being detected. This is because a constantly running diagnostic log consumes processor time, and there is a cost for this compute and the storage for the logged metrics. Accordingly, in some systems, the metrics may be collected only from the time the issue was discovered instead of recording all the time, thus, missing the actual event and the important metrics leading up to the event.

This inventive method performs three novel operations: 1) Anticipatory collection of metrics; 2) Injection of such metrics into a diagnostic system that makes it appear to the system as if the metrics had been collected all along, even before the diagnostic system was started; and 3) Injection of already-collected logs into a diagnostic system that makes it appear to that system as if the logs had been ingested all along, even before the diagnostic system was started. (A log denotes an event that occurred at a particular time.) The key to the second and third operations is that the diagnostic system itself does not have to try to integrate a historical view with a contemporaneously-collected view; rather the inventive method integrates these operations so that the diagnostic system sees a contemporaneous view that goes back in time before a triggering event that triggers (e.g., by user action) the execution of the diagnostic program.

The present disclosure envisions a system that uses an agent running within each VM that collects a small number of predefined consumption constrained metrics. Here, the phrase consumption constrained refers to metrics that are (i) inexpensive to collect (in terms of costs associated with compute and storage), and (ii) stored in a circular buffer for holding diagnostic data (for the purpose of analyzing some event that occurred in the past) that is collected over time (e.g., the time period of a rolling capture window=-1 week or -1 day). The data in the buffer never leaves the VMs, and the activity of the agent is constrained. Therefore, the customer is not charged for external storage, network consumption, or CPU consumption.

Unlike external storage and network egress, customers are always charged for CPU consumption. The consumption constrained metrics do not use up (consume) a significant fraction of the available CPU capacity the customer is paying for. For example, suppose a customer pays X for one hour (3600 seconds) of VM time. The terms consumption constrained metrics means that as few of those 3600 seconds are used up (consumed) in capturing and compressing the metrics. By keeping the data local to the VM, neither external storage nor network egress is used up (consumed) in capturing and compressing the metrics.

The following are some examples of data collected in anticipation of future need according to the present disclosure. Examples of processor data include % busy/IO Wait/Interrupt/Idle (these add up to 100%), and % user/low-pri/privileged time (these add up to 100%). Examples of memory data include % Used memory, Page ops (combined page-in and page-out) per sec, and % Used swap. Examples of file system data, per mounted file system, include % Free space, % Free inodes, Read ops/sec, and Write ops/sec. Examples of disk data, per attached device, include Average I/O queue length. Additionally, data about Syslog events may also be collected. Note that collecting and storing these locally is a normal part of operation for every Linux system. Therefore, in addition to storing these log messages ahead of request, the present disclosure decompresses, reformats, and timestamps them and injects them into the collection system, when diagnostics are enabled, as if the events had been collected outside the VM when they originally occurred.

The following are some examples of data not collected before requested to do so according to the present disclosure. Examples of network data include Network statistics (host-based metrics are sufficient). Examples of memory data include Separate page-in/page-out stats, Absolute (vs. percentage) metrics. Examples of file system data include Absolute (vs. percentage) metrics, Read/write in bytes/sec units. Examples of disk data include Ops/sec, bytes/sec, average op time for reads, writes. Examples of operating system (OS) data include Process tables.

When an event to be diagnosed occurs (also equivalently called a diagnosis worthy event, an event of interest, or a significant event throughout the present disclosure), an action is taken to enable collection of in-depth diagnostic data. That action can be taken by the user by, for example, using a web-based portal (e.g., shown as portal 20 in FIG. 1) to enable/configure diagnostics, or using a command-line tool. That action causes a diagnostic program to begin running within the VM. That action also causes another program to run which uses the pre-collected data to produce events (log events or metric collection events) which are fed to the diagnostic program. The program constructs, by decompressing and reformatting the pre-collected data for use by the diagnostic program, these events so they are timestamped to indicate they occurred at the historical point in time they were collected, rather than the moment in time when they were constructed and timestamped for provisioning to the diagnostic program.

The net result is that the diagnostic program in the VM has some data from before the event of interest occurred as well as data collected contemporaneously after the diagnostic program was enabled. The diagnostic program can then process both sets of data to determine the cause of the event. While the term real time is used throughout the present disclosure, which implies a latency of a few fractions of a second, what is meant by real time is contemporaneous, and what is meant by contemporaneous is not historical.

It should be noted that some of the metrics being collected are from outside the VM (host level), which are collected in part to manage the cloud infrastructure, while others are from inside the VM for customer consumption. Further, when preparing the metrics to forward to the diagnostic program, some data may need to be uncompressed, as the metrics might be in compressed form within the buffer.

The inventive method and its technical effects are now described in detail. Typically, a user turns on a diagnostics program using the portal and specifies the type of data to collect for diagnostics purposes. The user can later go back to the portal and view the data collected since the diagnostics was turned on. The purpose of the inventive method is to collect a subset of the data when the user has not turned on the diagnostics. Accordingly, when the user turns on the diagnostics, specifies the data to be collected, the diagnostics program has some of the data from before the diagnostics was turned on since the inventive method already collected a subset of the data before the diagnostics was turned on. Thus, the user can view, and the diagnostics program can analyze, historical data collected before the point in time when the user turns on the diagnostics and requests data collection.

The inventive method collects a subset of the data that the diagnostics would normally collect so as to reduce to a bare minimum the amount of resources consumed in collecting the data (i.e., the cost of collecting data) that the customer may not care about. There are two classes of data. One class of data includes data that a host normally collects for internal use (i.e., to properly run the cloud infrastructure). The other class of data is collected from within a virtual machine (VM), which is of interest for the purpose of the inventive method of the present disclosure. Some of the data collected from within a VM can be collected cheaply (i.e., without consuming a lot of resources) while other data may be expensive to collect (i.e., collecting consumes a lot of resources) and may not be collected unless the user specifies.

There are three costs associated with collecting the data. The first cost is the amount of processor time used within the VM to collect the data. The second cost is the network bandwidth consumed in sending the data out of the VM. The third cost is the cost of storing the data outside the VM. Since the inventive method stores the collected data within the VM and since the data stays in the VM until being sent to the diagnostics program when it is turned on, the customer does not incur the second and third costs. Further, since the method collects only a subset of data, the first cost is significantly minimized.

The subset of data that the method collects excludes large data sets such as process tables (snapshots of processes that are running). The subset of data that the method collects includes metrics such as total CPU usage, total working set size (totaled for all processes), swap usage, and disk I/O queue length. For example, the total CPU usage can indicate at what point in time the CPU usage spiked. The working set size can indicate at what point in time something unexpectedly grew in size and occupied a large portion of the memory. The swap usage can indicate at what point in time the memory usage became full and swapping began, leading to a significant loss of performance. A growing I/O queue length can indicate at what point in time the disk I/O began falling behind.

Collecting and storing these metrics consumes scant processing and storage resources. The collective amount of data associated with these metrics is very small and can be stored in a small buffer (e.g., a 1 MB circular buffer), which is negligible and insignificant compared to the amount of memory and disk space normally allocated to the VM. Further, the write size for storing the data can be the atomic write size of the operating system so that the data may not be lost in the event of a crash. Thus, the data can be stored in a single dense file without the need to manage disk space.

When the collected data is needed upon the diagnostics program being turned on, the data condensed in the file can be quickly and easily converted to a format used by the diagnostics program. When the diagnostics program is turned on, it collects data specified by the user and writes the data in a storage table (e.g., one row per metric per and a few rows per time stamp). The condensed data collected in the file before the diagnostics is turned on can be expanded and put into corresponding rows. Accordingly, the historical data collected by the inventive method from before the diagnostics program is turned on is made available to the diagnostics program along with the timestamps indicating when the historical data was originally captured.

A code to perform the inventive method can be integrated into an agent that runs on a VM. Only the owner of the VM can access the data collected by the method. Further, the user can turn the method on or off. When the diagnostics program is turned on, it looks for the file in which the data collected by the inventive method is stored. If the file exists, the diagnostics program extracts the data from the file, unpacks the extracted data (since it is stored in the file in a compact form), and populates appropriate rows in the table with the expanded data. Then the file is removed. Subsequently, when the diagnostics program is turned off, the method is turned on again so that the periodic capture of the subset of the data begins again while the diagnostics program remains turned off. In other words, a handshake of the kind described above takes place between the diagnostics program and the code in the agent that executes the inventive method.

The kind of data captured by the inventive method is independent of the type of VM or customer's usage scenarios. The selection of the type of data to be collected by the method is made solely based on the goal of minimizing the resources consumed in collecting and storing the data captured by the method.

The data collected by the method can be used for other purposes. For example, periodically, a snapshot of the collected data can be taken and analyzed at the back end. Based on the analysis, a recommendation can be made to the user to upgrade the VM or to alter its resource allocation. Also, when the user turns on the diagnostics and specifies a particular data to be collected by the diagnostics, that data can also be analyzed at the back end to make a recommendation to the user to upgrade the VM or to alter its resource allocation. Additionally, the collected data can be used by support staff in addressing customer issues or in diagnosing infrastructure problems detected through other means.

Figure 2:
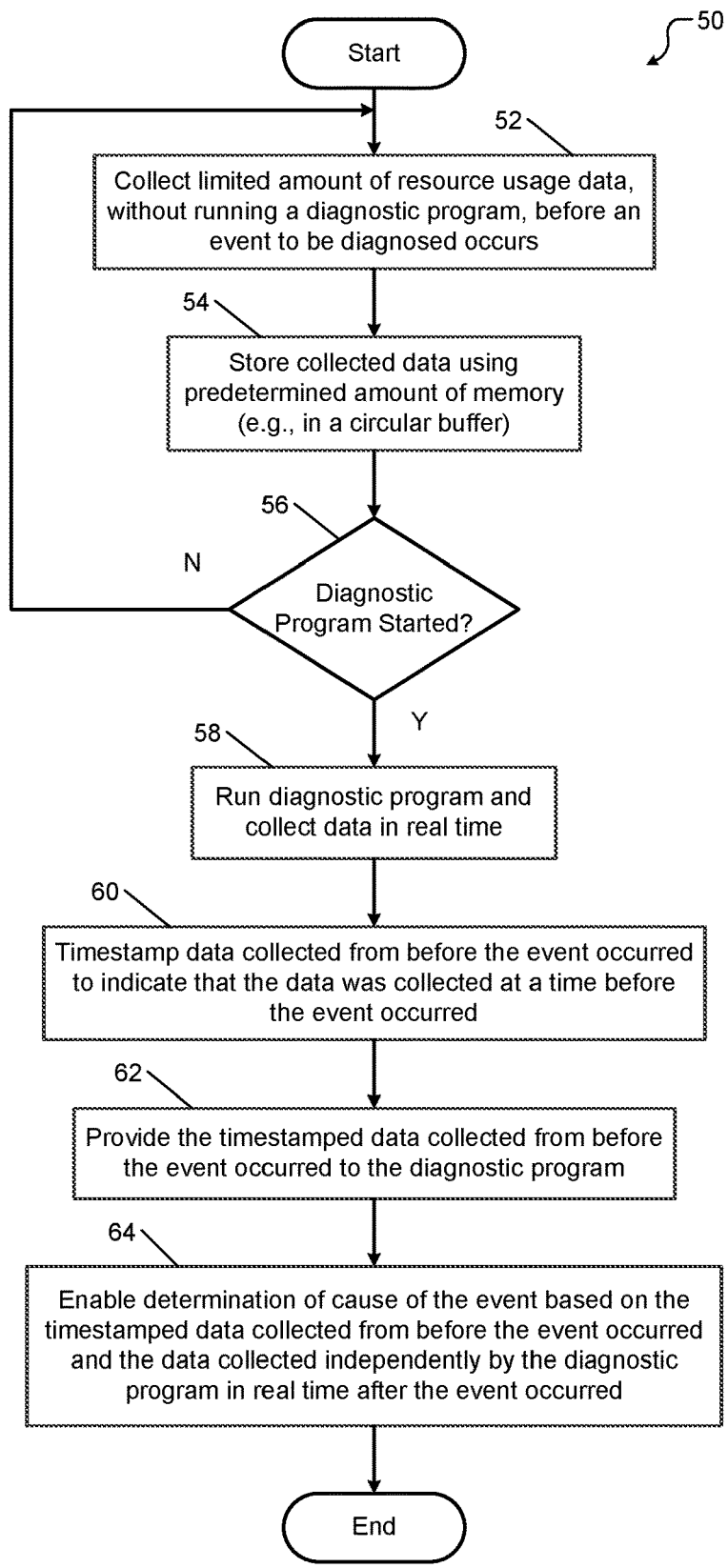
FIG. 2 is a flowchart illustrating an example of a method for collecting and storing data in a virtual machine before an event of interest occurs and providing the data to the diagnostic program after the event occurs.
Figure 3:
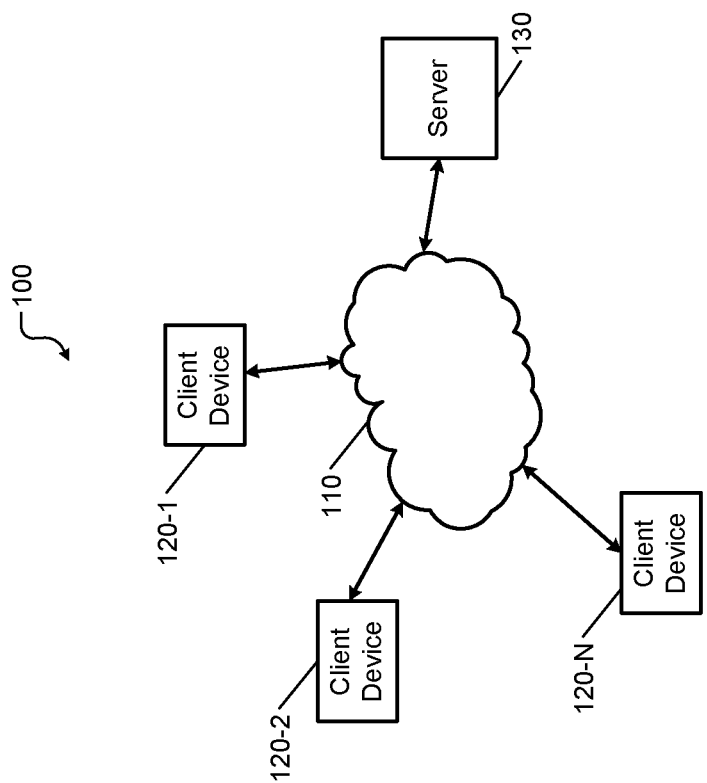
FIG. 3 is a functional block diagram of a simplified example of a distributed network system that can implement the cloud computing system of FIG. 1.

FIG. 2 shows a method 50 for collecting and storing data before an event occurs and providing the data to the diagnostic program after the event occurs according to the present disclosure. In the description of the method 50 that follows, the term control refers to one or more client applications 166 and server applications 186 described below with reference to FIGS. 3-5. In other words, the term control as used in the description of the method below represents code or instructions executed by one or more components of the client device 120 or the server 130 shown in FIGS. 3-5 (whichever implements a node running a VM in a cluster 34 shown in FIG. 1, a virtual machine running on a standalone computer system running on premises, or a physical host in the absence of virtualization (collectively referred to as a computing device or a computing system) to perform the described functionality.

At 52, control collects a limited amount of resource usage data within a virtual machine without running a diagnostic program on the VM and before an event of interest occurs on the VM. At 54, control stores the collected data using a predetermined amount of memory (e.g., a circular buffer having a limited amount of memory) within the VM.

The user selects an event of interest, which causes the user to start the diagnostic program. The user starts the diagnostic program through the CRP portal (or API); and the CRP uses the guest agent to start the diagnostic program as explained above. At 56, control checks if the diagnostic program is started. At 58, if the diagnostic program is started, the diagnostic program collects additional data specified by the user in real-time.

At 60, control timestamps the data collected from before the event occurred to indicate that the data was collected at a time before the event occurred. At 62, control provides the timestamp data collected from before the event occurred to the diagnostic program. At 64, the diagnostic program moves the collected metrics and logs out of the VM and into an analyzer (see definition below), where other tools (graphing, log search, automated analytics) can operate upon them for further analysis to enable determination of the cause of the event based on the timestamped data collected from before the event occurred and the data collected independently by the diagnostic program in real time after the event occurred. Thus, control makes a pre-event view of metrics and logs visible to such tools in a way that the tools see an integrated before/after view of the data. That is, control makes the collected data available for analysis by someone or something (e.g., some person, tool, or system (collectively referred to as an analyzer throughout the present disclosure) that can analyze the collected data), and makes the collected data available in a way that shows the metrics/logs in an integrated stream which begins before the diagnosis-worthy event.

While not shown, subsequently, the user turns off the diagnostic program, and control returns to 52. Also, while not shown, the stored collected data at 54 may be analyzed to provide a recommendation to the user regarding upgrading the VM or its resources. In addition, the data collected by the diagnostic program at 58 can also be analyzed to provide a recommendation to the user regarding upgrading the VM or its resources.

Below are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs (or programs) are to be understood broadly as representing machine readable instructions executable by the computing devices.

FIG. 3 shows a simplified example of a distributed network system 100 that can implement the cloud computing system 10 shown in FIG. 1. The distributed network system 100 includes a network 110, one or more client devices 120-1, 120-2, . . . , and 120-N (collectively client devices 120) (where N is an integer greater than or equal to one), and a server 130. The network 110 may include a local area network (LAN), a wide area network (WAN) such as the Internet, or other type of network (collectively shown as the network 110). The client devices 120 communicate with the server 130 via the network 110. The client devices 120 and the server 130 may connect to the network 110 using wireless and/or wired connections.

For example, the client devices 120 may include smartphones, personal digital assistants (PDAs), laptop computers, personal computers (PCs), and so on. The server 130 may provide multiple services to the client devices 120. For example, the server 130 may execute a plurality of software applications. The server 130 may host multiple databases that are utilized by the plurality of software applications and that are used by users of the client devices 120.

While only one server is shown, the distributed network system 100 may include multiple servers. For example, the servers may be located in different geographical locations. For example, one or more servers 130 may implement the cloud controller 12 shown in FIG. 1, and the client devices 120 may implement the fabric controllers 32. As another example, one or more servers 130 may implement the fabric controllers 32. As yet another example, one or more servers 130 may implement nodes (not shown) of the clusters 34; and so on. In other words, a client device 120 may operate as a server 130 for devices that are downstream from the client device 120.

FIG. 4 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more applications executed by the server 130 via the network 110. The client device 120 may implement a node running a VM in a cluster 34 shown in FIG. 1, a virtual machine running on a standalone computer system running on premises, or a physical host in the absence of virtualization (collectively called a computing system). In either case, the client applications 166 may include a diagnostics program describe above that can run on the VM and code that executes the inventive method describe above.

FIG. 5 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186. The bulk storage 182 may store one or more databases 188 that store data structures used by the server applications 186 to perform respective functions. The server 130 may implement a node running a VM in a cluster 34 shown in FIG. 1. In that case, the server applications 186 may include a diagnostics program describe above that can run on the VM and code that executes the inventive method describe above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a processor configured to:
      collect resource usage data regarding resource use within a computing system, the resource usage data being collected periodically, without running a diagnostic program, and before occurrence of a diagnosis event;
start the diagnostic program to contemporaneously collect diagnosis data in response to the occurrence of the diagnosis event;
convert collected resource usage data into a format used by the diagnostic program and timestamp the collected resource usage data to indicate that the collected resource usage data occurred prior to the occurrence of the diagnosis event; and
provide the collected resource usage data to the diagnostic program executed after the occurrence of the diagnosis event so that the diagnostic program has an integrated view of resource usage data from before the occurrence of the diagnosis event with the diagnosis data collected by the diagnostic program in response to the occurrence of the diagnosis event to enable determination of a cause of the diagnosis event.

2. The system of claim 1, wherein the collected resource usage data from before the occurrence of the diagnosis event and the diagnosis data collected by the diagnostic program in real time after the occurrence of the diagnosis event are processed by the diagnostic program to provide to an analyzer that analyzes the processed data to determine the cause of the diagnosis event.

3. The system of claim 1, wherein collecting the resource usage data periodically and without running the diagnostic program consumes fewer resources than collecting the diagnosis data by running the diagnostic program.

4. The system of claim 1, wherein the collected resource usage data includes data regarding use of one or more of processing and storage resources by the computing system.

5. The system of claim 1, wherein the processor is further configured to store the collected resource usage data in a circular buffer having a predetermined amount of memory.

6. The system of claim 1, wherein the processor is further configured to collect and store the resource usage data using less than or equal to a predetermined amount of resources allocated to the computing system.

7. The system of claim 1, wherein the processor is further configured to:
store at least some of the collected resource usage data in a compressed form, and
provide the collected resource usage data in a decompressed form to the diagnostic program.

8. The system of claim 1, wherein the collected resource usage data is used by an analyzer to generate a recommendation for reconfiguring the computing system or for reconfiguring one or more resources of the computing system.

9. The system of claim 1, wherein the collected resource usage data is stored in a compressed format and
wherein the processor is further configured to convert the collected resource usage data into the format used by the diagnostic program by expanding the collected resource usage data and populating the collected resource usage data into corresponding rows of a data table used by the diagnosis program for analysis of the diagnosis event.

10. A method comprising:
collecting resource usage data regarding resource use within a computing system;
collecting the resource usage data periodically, without running a diagnostic program, and before occurrence of an event to be diagnosed;
starting the diagnostic program to contemporaneously collect diagnosis data in response to the occurrence of the event;
converting collected resource usage data into a format used by the diagnostic program and timestamp the collected resource usage data to indicate that the collected resource usage data occurred prior to the occurrence of the event; and
providing the collected resource usage data to the diagnostic program executed after the occurrence of the event so that the diagnostic program has an integrated view of resource usage data from before the occurrence of the event with the diagnosis data collected by the diagnostic program in response to the occurrence of the event to enable determination of a cause of the event.

11. The method of claim 10, further comprising providing the collected resource usage data to the diagnostic program with timestamps indicating times when the data was collected.

12. The method of claim 10, wherein the collected resource usage data from before the occurrence of the event and diagnosis data collected independently by the diagnostic program in real time after the occurrence of the event are processed by the diagnostic program to enable determination of the cause of the event.

13. The method of claim 10, wherein collecting the resource usage data periodically and without running the diagnostic program consumes less resources than collecting diagnosis data by running the diagnostic program.

14. The method of claim 10, further comprising collecting the resource usage data including data regarding use of one or more of processing and storage resources by the computing system.

15. The method of claim 10, further comprising storing the collected resource usage data in a circular buffer having a predetermined amount of memory.

16. The method of claim 10, further comprising collecting and storing the resource usage data using less than or equal to a predetermined amount of resources allocated to the computing system.

17. The method of claim 10, further comprising:
storing at least some of the collected resource usage data in a compressed form; and
providing the collected resource usage data in a decompressed form to the diagnostic program.

18. The method of claim 10, further comprising providing a recommendation for reconfiguring the computing system or for reconfiguring one or more resources of the computing system based on the collected resource usage data.

19. A system comprising:
a processor configured to:
collect resource usage data regarding use of one or more of processing and storage resources by a computing system, the resource usage data being collected periodically in a circular buffer, without running a diagnostic program, and before occurrence of an event to be diagnosed by the diagnostic program;
start the diagnostic program to contemporaneously collect diagnosis data in response to the occurrence of the event;
convert collected resource usage data into a format used by the diagnostic program and timestamp the collected resource usage data to indicate that the collected resource usage data occurred prior to the occurrence of the event; and
provide the collected resource usage data, with the timestamp indicating times when the data was collected, to the diagnostic program when the diagnostic program is executed after the occurrence of the event so that the diagnostic program has an integrated view of the resource usage data, from before the occurrence of the event and the diagnosis data collected independently by the diagnostic program in real time after the occurrence of the event, to enable determination of a cause of the event.

20. The system of claim 19, wherein the processor is further configured to collect and store the resource usage data using less than or equal to a predetermined amount of resources allocated to the computing system, and wherein collecting the resource usage data periodically and without running the diagnostic program consumes fewer resources than collecting diagnosis data by running the diagnostic program.

* * * * *